United States Patent
Hrle et al.

(10) Patent No.: US 10,452,629 B2
(45) Date of Patent: Oct. 22, 2019

(54) AUTOMATIC MAINTENANCE OF A SET OF INDEXES WITH DIFFERENT CURRENCY CHARACTERISTICS IN A DATABASE MANAGEMENT SYSTEM

(75) Inventors: Namik Hrle, Boeblingen (DE); Johannes Schuetzner, Boeblingen (DE); James Z. Teng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 13/082,174

(22) Filed: Apr. 7, 2011

(65) Prior Publication Data

US 2012/0016881 A1    Jan. 19, 2012

(30) Foreign Application Priority Data

Jul. 13, 2010    (EP) .................... 10169373

(51) Int. Cl.
   *G06F 16/22*    (2019.01)
(52) U.S. Cl.
   CPC .................. *G06F 16/22* (2019.01)
(58) Field of Classification Search
   CPC ........................................ G06F 16/22
   USPC ........................ 707/736, 741–746
   See application file for complete search history.

(56) References Cited

U.S. PATENT DOCUMENTS 5,404,510 A    4/1995    Smith et al.
5,806,058 A    9/1998    Mori et al.
(Continued)

FOREIGN PATENT DOCUMENTS

CN    101286160 A    10/2008

OTHER PUBLICATIONS

Gibas, Michael; Canahuate, Guadalupe; Ferhatosmanoglu, Hakan, "Online Index Recommendations for High-Dimensional Databases Using Workloads." IEEE Transactions on Knowledge and Data Engineering, vol. 20, No. 2, Feb. 2008. Retrieved from the Internet: <http://ieeexplore.ieee.org/Xplore/login.jsp?url=http%3A%2F%2Fieeexplore.ieee.org%2Fiel5%2F69%2F4409559%2F04358967.pdf%3Farnumber%3D4358967&authDecision=-203>. Retrieved on Feb. 16, 2010.
Updated Statistics. SQL TEAM.com. Retrieved from the Internet: <http://www.sqlteam.com/forums/topic.asp?TOPIC_ID=96416>. Retrieved on Feb. 23, 2010.
Event Mechanism. DSpace Wiki. Retrieved from the Internet: <http://wiki.dspace.org/index.php/EventMechanism>. Retrieved on Feb. 23, 2010.

(Continued)

*Primary Examiner* — Syling Yen
(74) *Attorney, Agent, or Firm* — Mollborn Patents, Inc.; Fredrik Mollborn

(57) ABSTRACT

Methods and apparatus, including computer program products, for maintaining a set of indexes in a database management system (DBMS) having at least one table. A current, stale or deferred status is defined for at least a part of the indexes, resulting in at least a part of a set of current, stale, or deferred indexes in the DBMS. Current indexes are maintained by refreshing a current index synchronously with a table change relating to the current index. Stale indexes are maintained by refreshing a stale index continuously and asynchronously to table modifications of tables relating to the stale index based on log information relating to the modifications. Deferred indexes are maintained by building a deferred index in response to a query to a table relating to the deferred index, thereby bringing the deferred index in accordance with the current query time status to the table relating to the deferred index.

16 Claims, 4 Drawing Sheets

(56) References Cited

U.S. PATENT DOCUMENTS

| | | |
|---|---|---|
| 6,466,942 B1 | 10/2002 | Tolkin |
| 6,694,323 B2 | 2/2004 | Bumbulis |
| 7,028,022 B1 | 4/2006 | Lightstone et al. |
| 2002/0120617 A1 | 8/2002 | Yoshiyama et al. |
| 2006/0074977 A1* | 4/2006 | Kothuri et al. ............ 707/104.1 |
| 2006/0294058 A1 | 12/2006 | Zabback et al. |
| 2008/0005092 A1* | 1/2008 | Kleewein et al. ................ 707/4 |
| 2008/0154994 A1 | 6/2008 | Fischer et al. |
| 2008/0249990 A1 | 10/2008 | Baby et al. |
| 2008/0275840 A1 | 11/2008 | Burger et al. |
| 2010/0036886 A1 | 2/2010 | Bouloy et al. |
| 2010/0306222 A1 | 12/2010 | Freedman et al. |

OTHER PUBLICATIONS

Seshadri, Praveen; Swami, Arun, "Generalized Partial Indexes." Proceeding: ICDE '95 Proceedings of the Eleventh International Conference on Data Engineering, IEEE Computer Society Washington, DC, USA 1995.

Sartori, Claudio; Scalas, Maria Rita, "Partial Indexing for Nonuniform Data Distributions in Relational DBMS's." IEEE Transactions on Knowledge and Data Engineering, v. 6, No. 3, Jun. 1994.

U.S. Appl. No. 13/085,281 Final Office Action. Notification Date Jul. 8, 2013.

U.S. Appl. No. 13/085,281 Non-final Office Action. Notification Date Aug. 1, 2014.

U.S. Appl. No. 13/085,281 Non-final Office Action. Notification Date Mar. 5, 2013.

U.S. Appl. No. 13/085,281 Notice of Allowance, dated Oct. 2, 2014.

\* cited by examiner

AUTOMATIC MAINTENANCE OF A SET OF INDEXES WITH DIFFERENT CURRENCY CHARACTERISTICS IN A DATABASE MANAGEMENT SYSTEM

CROSS REFERENCE TO RELATED APPLICATIONS

This application claims priority to European Application No. EP 10169373.7, filed on Jul. 13, 2010, and entitled "AUTOMATIC MAINTENANCE OF A SET OF INDEXES WITH DIFFERENT CURRENCY CHARACTERISTICS IN A DATABASE MANAGEMENT SYSTEM," the contents of which is incorporated herein in its entirety.

FIELD OF THE INVENTION

The present invention relates generally to maintaining indexes in a database management systems.

BACKGROUND

Modern relational database systems are typically vast data repositories that are measured in terabytes (TB) or even hundreds of terabytes. Individual tables of hundreds of gigabytes (GB) and more are no longer rare cases. Retrieving required information from such a table cannot be efficiently performed by a sequential scanning of the entire table even though increasing processor memory provides very large caches to keep physical disk access at a minimum. Indexing is the most common technique to address the challenge of fast information access and it has been used for a long time. An index is based on the values of data in one or more columns of a table accompanied with pointers to the data. Accessing data through an index enables fast retrieval in the case of a query with matching selection condition. As the queries typically come with different selection conditions, there is a need to define multiple indexes or indices on the same table. Indices or indexes may also be used for other purposes such as enforcing uniqueness.

The indexes are typically stored separately from the table storing the content and need to be maintained for table modification operations such as row inserts, deletes and those updates that change the value of the columns that make up the index key.

The maintenance of an index is typically performed automatically by the database management system (DBMS). For example, for each inserted row, the DBMS updates every index that exists for the respective table. Thus, an index update consists of adding an entry pointing to the inserted row in the related table. The entry is added into the index at the appropriate position that is determined by the index tree structure and the index key value. The DBMS performs the updates of the indexes synchronously with the corresponding table row operation: it is an atomic operation that ensures that the table modification is visible to queries to the table at the same time irrespective of accessing the table directly or via an index. One can say that such an index is current, i.e. in synchronization, or shortly in sync, with the associated table.

Only in exceptional cases, it is possible to delegate an index maintenance function to a special user, namely a database administrator. That is, if the user knows the exact time when a particular query that needs a specific index access is executed, he can initialize building the index just in time for the incoming query. This could be the case for, e.g., an end of the month payroll calculation. It also requires a careful planning of maintenance operations because building an index on large tables can take a very long time (hours and, in extreme cases, even days).

While having appropriate indexes is crucial for efficient query execution, index maintenance results in performance degradation of almost all types of table content modification operations like inserts, updates and deletes. Every additional index of a database table adds more to the elapsed time of these operations. The elapsed time increase is typically very large because index maintenance often involves bringing relevant index pages (blocks) from a disk, a hard disk or other external storage, which is proportionally very slow if compared to main memory. This significantly contributes to one of the most common performance challenges: fitting a given data modification workload in a required time window.

If an index is used by queries that run concurrently with data modification operations, then that index needs to be current, i.e., maintained synchronously with data modification operations. But, that is not the case for all indexes: some of them are needed only periodically, when the corresponding queries are in the system. As mentioned earlier, the only available option for this situation is not to let the DBMS to maintain these indices, but to create them manually before the corresponding query workload. However, this method may be static, manual-work intensive and, in some cases not usable. For example, the times when a query is executed may be unpredictable, or the periods between two consecutive query executions may be too short to allow building the required index.

The document US 2008/0154994A1 discloses a database management system with two index types: current and aged indexes. The indexes statuses are determined in the context of business processes, e.g., paid or unpaid invoices. The indexes statuses may also be determined based on a time since a last access to a specific table. More detailed status levels are possible, e.g., based on the time an index has been last accessed.

In another document, US 2008/0275840A1, a statistics update process for a relational database management system is described. A data dictionary maintains bookkeeping information, typically in the form of meta-data that are used by processes of the database management system. The meta-data also contain statistics for generating execution plans for several tasks in the database system. E.g., a stale flag and a modified count may be maintained by the statistics. The stale flag indicates if the statistics for a respective column or index are out of date.

In a similar way, reference is made to stale statistics in document US 2006/0294058A1. The statistics may be updated if, e.g., 20% of the tables have been updated since the statistics were created. In this case the statistics may be called stale. In case of a query to a table with an old index, a new index will be created.

Thus, there may be a need for an improved architecture for maintaining indexes in a database management system such that performance requirements are easily met while managing large data volumes.

SUMMARY OF THE INVENTION

According to one aspect of the present invention, methods and apparatus, including computer program products are provided for maintaining a set of indexes in a database management system having at least one table. A status is defined for at least a part of the indexes. The status includes a current status, a stale status, or a deferred status, and results in at least a part of a set of current indexes, a set of stale indexes, and a set of deferred indexes in the database management system. The set of current indexes is maintained by refreshing a current index synchronously together with a table change relating to the current index. The set of stale indexes is maintained by refreshing a stale index continuously and asynchronously to table modifications relating to a table relating to the stale index based on log information relating to the table modifications. The set of deferred indexes is maintained by building a deferred index in response to a query to a table relating to the deferred index, thereby bringing the deferred index in accordance with the current status for a time of the query to the table relating to the deferred index.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Embodiments of the invention will now be described, by way of example, and with reference to the following drawings.

DETAILED DESCRIPTION

Figure 1:
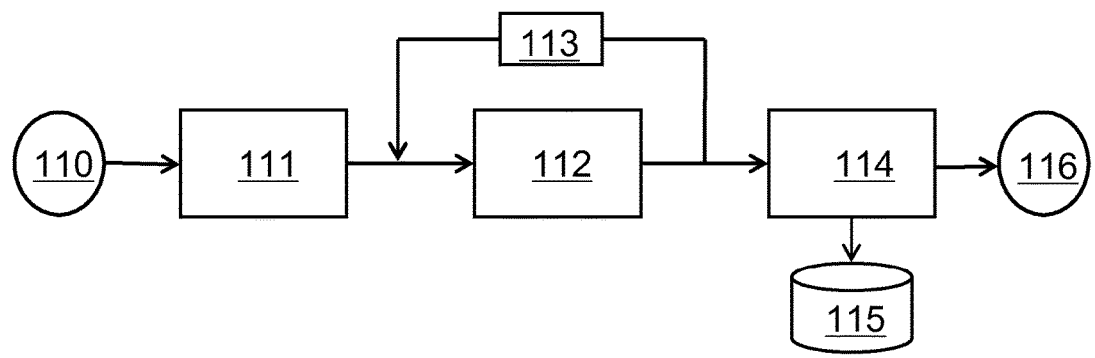
FIG. 1 shows a block diagram of a conventional method for maintaining current and deferred indexes.

In the context of this application the following expression conventions have been followed:

Database management system (DBMS)—A database management systems may be a set of computer programs and/or hardware components that control the creation, maintenance, and/or the use of the database with a computer as a platform. A DBMS may use any of a variety of database models, such as a network model or a relational model.

Database table—In relational databases and flat file databases, a table, may be a set of data elements (values) that may be organized using a model of columns, which may be identified by their name and rows. A table may have a specified number of columns, but can have any number of rows.

Database index—A database index may denote a data structure that may contribute in the context of data retrieval operations on a database table. Indexes may be created using one or more columns of a database table, providing the basis for both, rapid random look-ups and efficient access of ordered records.

Table change—A table change in a database management system may be an operation that changes the content of a table, i.e., at least one parameter in the table. It may comprise a deletion of an entry in the table, a modification of an entry in a table or a write or insert process, writing new content into an entry in a table, e.g., in the form of a modified or new row in the table. In all these cases, a related index to the table may also need maintenance, i.e., a modification or change in the index.

Synchronous index maintenance—In a synchronous index maintenance mode, the index content may be modified as part of a corresponding table content modifying operation. I.e., the index modifications are performed synchronously with a content modification, i.e., the index may be current with the corresponding table content.

Asynchronous index maintenance—In an asynchronous index maintenance mode the index content is modified outside the scope of the corresponding table content modifying operation. Such an index is generally not current.

Partitioning—In this context, partitioning may denote a split of a database table into multiple parts or partitions. Also, the corresponding index to the table may be split. As a result of the split, different partitions of the table may be maintained on different external storage media like different hard disks. The same may apply to the corresponding index of the table.

Current index—A current index may denote an index that is changed synchronously, i.e., at the same time, with associated table changes. Its content should be synchronized with the associated table.

Stale index—A stale index may denote an index that is changed asynchronously, i.e. not at the same time with the corresponding table. Its content may be 'stale', i.e., not always synchronized with the associated table. A stale index may be brought to a 'current' state, i.e., the content of the table and the corresponding index are maintained in parallel. Later on, the status of the stale index may fall behind the concurrency and becomes 'stale' again.

Deferred index—A deferred index may denote an index for which meta-data (e.g., only meta-data) such as index definitions exist. In an embodiment, its content does not exist and it is only built when a query, that may take advantage of the index, needs to be executed. A deferred index may be always being built in its entirety, from scratch. Because of the time-consuming character of the operation and often unpredictable query arrival, deferred indexes may not be used very often.

Global index—A global index may denote a "joint" index in the case a database table is partitioned. In case of partitioned database tables also an associated index may be partitioned in the same way. Thus, an index with a single index tree that may span all partitions may be called a global index.

Continuously and asynchronously—This expression may characterise an update or refresh process of, e.g., an index of a database table that is not done during a table entry change but asynchronously to that change/modification. That is, a special daemon or process may be run independently of a database table and current index update process. However, it may be run continuously. For example, if the daemon has a lower system priority than queries or modifications/updates of tables relating to current indexes, then the refresh of a stale index may always be behind a current status. Actually, because the daemon for updating a stale index may have to wait for the end of a transaction in form of, e.g., a query or update/modification relating to a table of a stale index, a stale index may per se never be current. However, a stale index may be redefined as current index. Then all characteristics of current indexes apply to this index and vice versa.

Additionally, a stale index may reach a status corresponding to a current index if all modifications to a stale index have been applied and no more updates are required. Thus, a complete refresh may have been performed to the stale index.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the following, a detailed description of the drawings will be given. All illustrations in the drawings are schematic. Firstly, a conventional database management using a current and a deferred index will be described. Afterwards, an embodiment of a method for maintaining a set of indexes, including a stale index and its actualization will be described.

FIG. 1 shows conceptually a conventional database management system (DBMS) function for updating current indexes. The block diagram may start with the "start of table content modifying operation", 110. Firstly, the table content may be modified, i.e., an entry in a database table may be created, modified or deleted, 111. Block 112 may represent an associated modification of an associated non-deferred index, i.e., a current index, of a respective database table. This may be repeated for all non-deferred indexes, 113. In block 114, a log entry may be written to a transaction log file 115. Such a log entry may be used for a roll-back operation or other database specific features. The block diagram ends with the block "end of table content modifying operation", 116. All non-deferred indexes are maintained synchronously with the content modification in the database.

Figure 2:
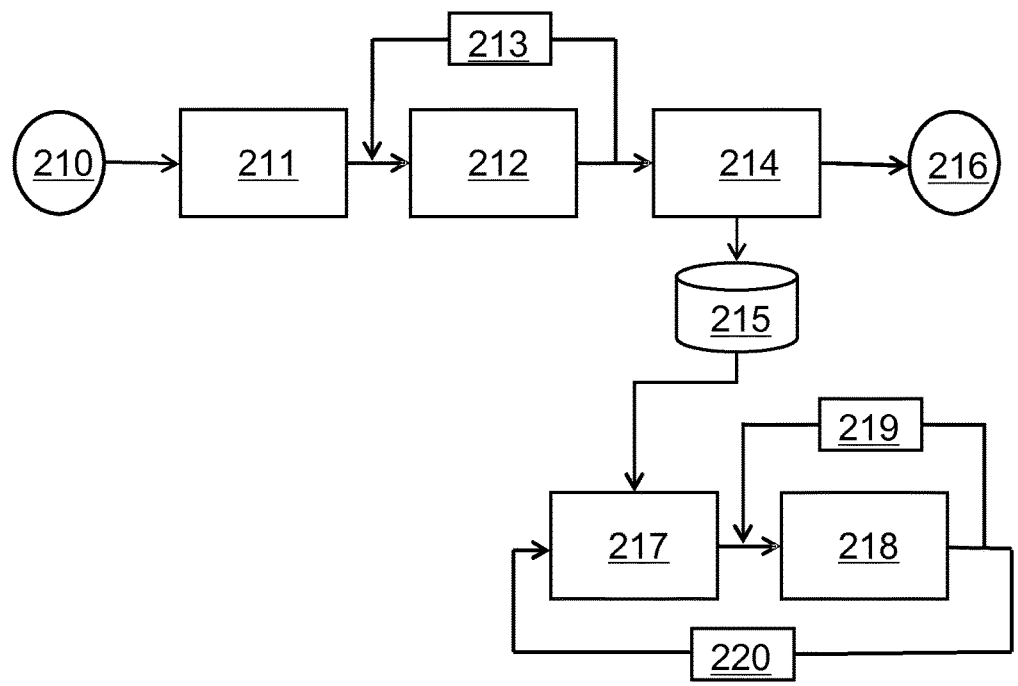
FIG. 2 shows a block diagram of a method for maintaining databases indexes, including a stale index according to an embodiment of the invention.

FIG. 2 shows in the upper half with blocks 210, 211, 212, 213, 214, and 216 a table content modifying process that is equivalent to FIG. 1 for current indexes. However, also an additional process called "apply index modification", 217, is shown.

In contrast to FIG. 1 with only current indexes, in log file 215, are now only those changes logged that belong to a stale index. That is, table changes may have been performed to one or more tables with stale indexes, but the indexes have not been updated. The changes are logged in log file 215 for further reference.

This process 217 may read the changes or modifications performed to a database table that may be logged in log file 215.

If a stale index needs to be brought to a current status, e.g., if an access is required to a table via a stale index, the process may apply index modifications 217 becomes active. It may read log file 215 and may bring the corresponding stale index to a current status by applying content changes made to the corresponding database table also to the stale index. There may be one log file 215 for all stale indexes, more than one log file 215 for one stale index or one log file 215 per each stale index. The log file 215 may also be implemented as one or more special tables of the DBMS. The process "modify index content", 218 may repeat itself, 219, until all modifications to a stale index have been applied to the index and may have brought the stale index to a current status, i.e., until no more modification needs to be applied to the respective stale indexes. Processes 217, 218 may repeat, 220, themselves until all stale indexes have been brought to a current status, if required.

The "apply index modifications" process 217 may be performed asynchronously to the table content modification operations. If a query to the database may need to use a stale index, i.e., accessing data in the database system via an index that may be in a stale mode, the query may be delayed until the stale index may be brought to a current status. The delay may be a result of a database query optimizer.

Figure 3:
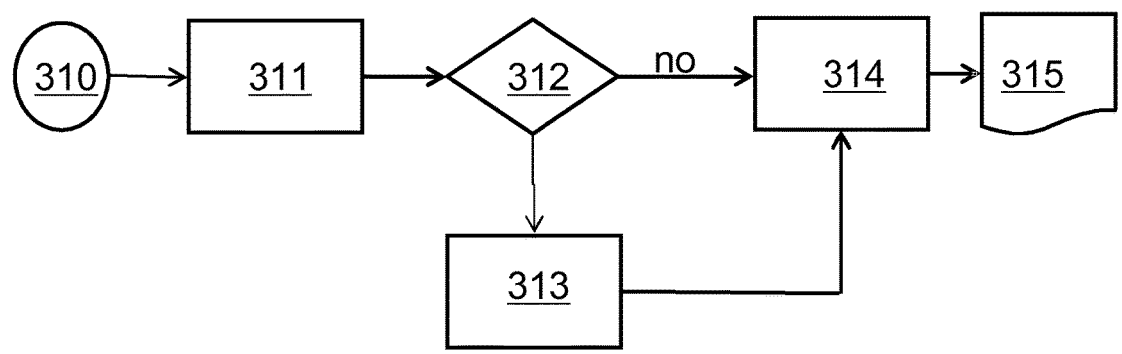
FIG. 3 shows a block diagram of a process bringing a stale index to a current status according to an embodiment of the invention.

FIG. 3 shows the process "bring stale index to a current status" embedded in additional functional blocks. If a query 310 enters the DBMS it may typically trigger a query optimization step, 311. Then it is determined, 312, whether the query needs access to data in the DBMS using a stale index. If the answer is "yes", an update process that may be called "bring stale index to a current status", 313, may be executed. During that process, the query that triggered it may need to wait for the completion of the update or refresh process. Once the DBMS may receive the request to bring a stale index to currency, it quiesces, i.e. delays, all related table content modifying operations, performs the last log apply iteration, i.e., updates the stale index with entries from the log file 215, and places the index into the synchronous maintenance mode or current state. After that, the query may be executed, 314, delivering a resulting data set 315. It may be possible to optimize this process according to a relative importance of a query vs. modifying operations, i.e. using workload management policies to favor one over another. It is also possible to rebuild the required index from the underlying table or combine that with the log information usage. Once a stale index may be brought to currency and started to be maintained synchronously with table modifications, the DBMS may monitor query accesses to the index and, in the case of detecting no interest in the index, may place it back into the asynchronous maintenance mode, i.e. stale mode.

Figure 4:
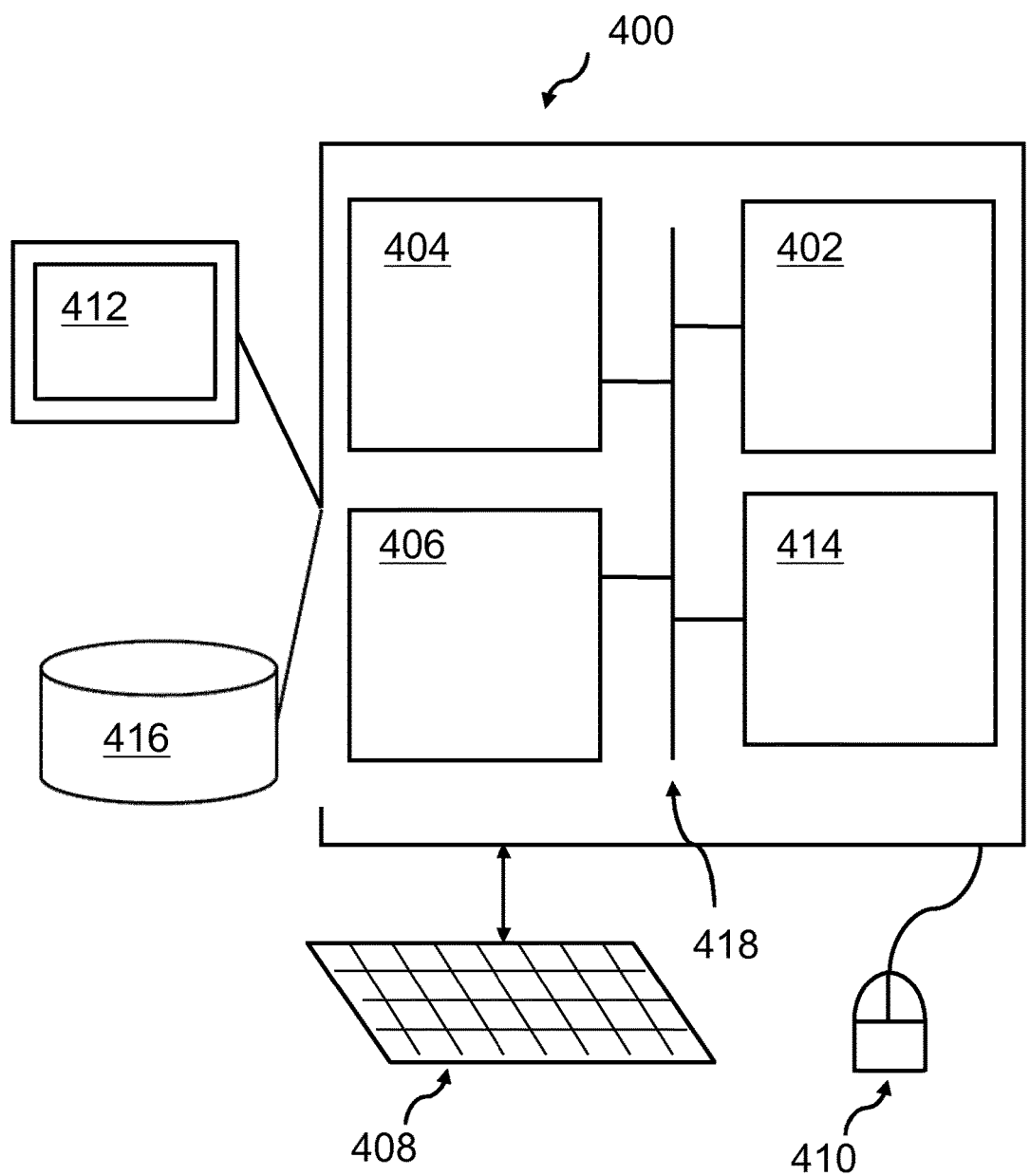
FIG. 4 shows a block diagram of a computer with components for executing a method for maintaining a set of indexes in a DBMS according to an embodiment of the invention.

Embodiments of the invention may be implemented on virtually any type of computer, regardless of the platform being used suitable, for storing and/or executing program code. For example, as shown in FIG. 4, a computer system 400 includes one or more processor(s), 402, with one or more cores per processor, associated memory elements, 404, an internal storage device 406 (e.g., a hard disk, an optical drive such as a compact disk drive or digital video disk (DVD) drive, a flash memory stick, etc.), and numerous other elements and functionalities typical of today's computers (not shown). The memory elements, 404, may include a main memory, employed during actual execution of the program code, and a cache memory, which provides temporary storage of at least some program code or data in order to reduce the number of times, code must be retrieved from external bulk storage, 416, for an execution. Elements inside the computer 400 may be linked together by means of a bus system 418 with corresponding adapters.

The computer, 400, may also include input means, such as a keyboard, 408, a mouse, 410, or a microphone (not shown). Furthermore, the computer 400 may include output means, such as a monitor, 412 [e.g., a liquid crystal display (LCD), a plasma display, or cathode ray tube (CRT) monitor]. The computer system, 400, may be connected to a network (e.g., a local area network (LAN), a wide area network (WAN), such as the Internet, or any other similar type of network including wireless networks via a network interface connection, 414. This allows a coupling to other computer systems. Those skilled in the art will appreciate that many different types of computer systems exist, and the aforementioned input and output means may take other forms. Generally speaking, the computer system, 400, includes at least the minimal processing, input and/or output means, necessary to practice embodiments of the invention.

Further, those skilled in the art will appreciate that one or more elements of the aforementioned computer system, 400, may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources.

Further, software instructions to perform embodiments of the invention may be stored on a computer readable medium such as a compact disk (CD), a diskette, a tape, or any other computer readable storage device.

Figure 5:
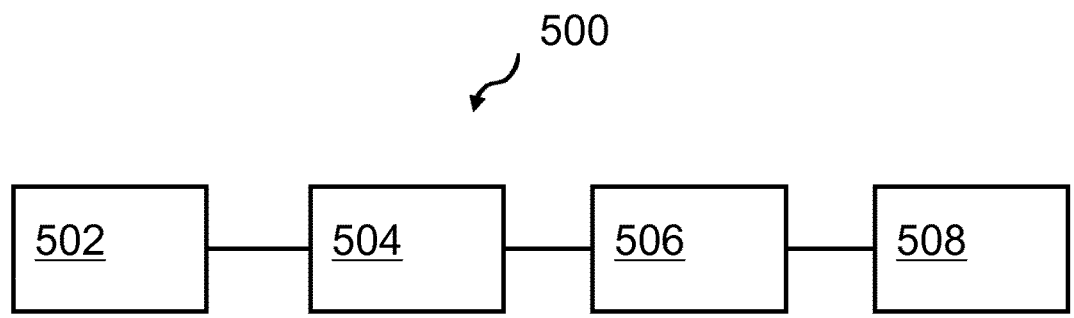
FIG. 5 shows a block diagram of functional blocks of a method for maintaining a set of indexes in a DBMS according to an embodiment of the invention.

FIG. 5 illustrates a block diagram of functional blocks of a method 500 for maintaining a set of indexes in a DBMS according to an embodiment of the invention. Block 502 represents a step of defining for at least a part of said indexes a status out of a group comprising a current status, a stale status, and a deferred status, resulting in at least a part of a set of current indexes, a set of stale indexes, and a set of deferred indexes in the database management system. Block 504 represents a step of maintaining the set of current indexes by refreshing a current index synchronously together with a table change relating to the current index. Block 506 represents a step of maintaining the set of stale indexes by refreshing a stale index continuously and asynchronously to table modifications relating to a table relating to the stale index based on log information relating to the table modifications. And block 508 represents a step of maintaining the set of deferred indexes by building a deferred index in response to a query to a table relating to the deferred index, thereby bringing the deferred index in accordance with the current status for a time of the query to the table relating to the deferred index.

Figure 6:
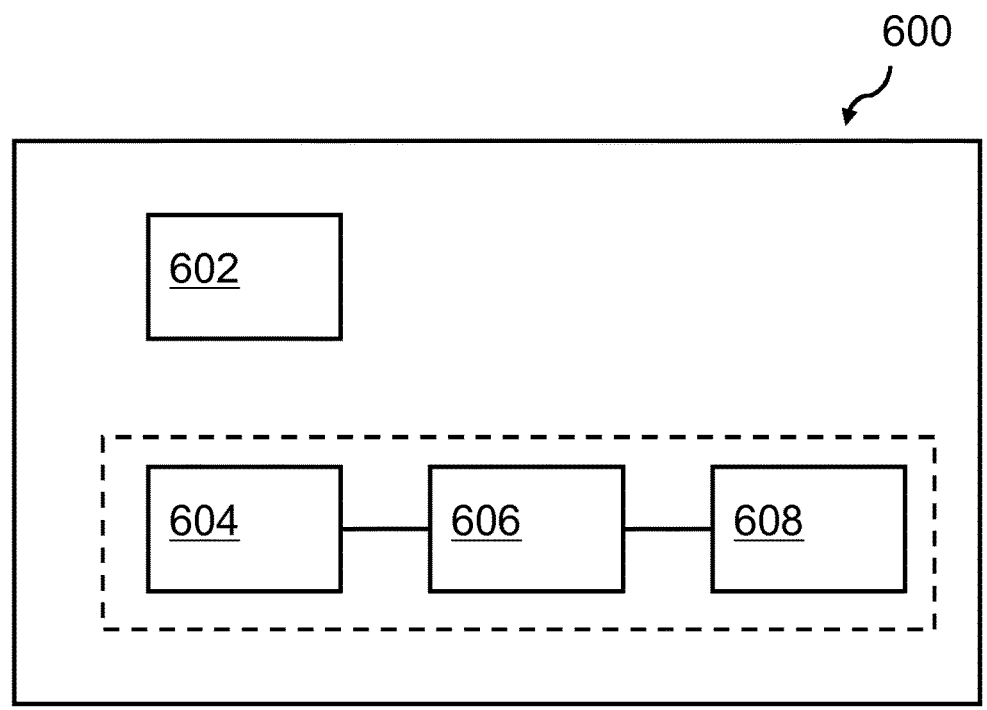
FIG. 6 shows a block diagram of functional blocks of a database management system according to an embodiment of the invention.

FIG. 6 shows a database management system 600 having at least one table, the database management system (DBMS) being adapted for maintaining a set of indexes. The DBMS comprises a defining unit 602 adapted for defining, for at least a part of said indexes, a status out of a group comprising a current status, a stale status, and a deferred status, resulting in at least a part of a set of current indexes, a set of stale indexes, and a set of deferred indexes in the database management system. The DBMS comprises further a maintaining unit 604, 606, 608 adapted for maintaining the set of current indexes by refreshing a current index synchronously together with a table change relating to the current index. The maintaining unit 604, 606, 608 may further be adapted for maintaining the set of stale indexes by refreshing a stale index continuously and asynchronously to table modifications relating to a table relating to the stale index based on log information relating to the table modifications. Additionally, the maintaining unit 604, 606, 608 may further be adapted for maintaining the set of deferred indexes by building a deferred index in response to a query to a table relating to the deferred index, thereby bringing the deferred index in accordance with the current status for a time of the query to the table relating to the deferred index.

The dashed line around the maintaining unit 604, 606, 608 may express that there may be different maintaining unit parts for a current index, a stale index and/or a deferred index. However, all maintaining units may also be part of a more comprehensive single maintaining unit.

The above-described techniques for maintaining a set of indexes in a database management system and the associated database management system may provide several advantages, as will now be described in the following paragraphs.

One of the advantages of this approach is faster data modification operations like inserts, deletes and index key changing updates, due to reducing the volume and the time consuming process of synchronous index maintenance. This is because only those indexes may need to be updated immediately which are defined as 'current'. Stale indexes are not immediately updated together with a data modification operation or simply a table change.

Embodiments may also result in much higher index availability in the case the index is not kept current by the DBMS due to applying incremental updates only, versus rebuilding the entire index, as it is the case for deferred indexes. Additionally, embodiments allow eliminating manual efforts in maintaining stale indexes because the system optimizes its operation by itself.

Additionally, embodiments work also at the granularity of database table partitions if a table is partitioned. If a query requires an index, which is currently in asynchronous update state, e.g., a stale index, and at the same time may need to access data from some partitions only, then only the related index partitions may be brought to a current status to speed up this process. Based on query predicates, this mechanism may determine whether a subset of all table partitions is sufficient to successfully process the query. As this mechanism may deal at partition level, it is more granular and will waste fewer resources, which would otherwise serve to bring the entire index to current, even if only a few partitions may be relevant for queries. However, it is not required to also partition the index for a partitioned table. The partitioning of the index may be seen as an additional design option.

Moreover, the process of bringing an index from asynchronous update state to a current state may also be improved by running it in parallel for partitioned tables. If a partitioned table has more than one global index (that is an index with a single index tree that covers the data of all partitions of a table), then each global index may be updated in parallel. In a database management system with parallel database engines, for example a DB2 data sharing system, asynchronous index updates may be done by parallel tasks across all database engines. A further benefit of the concept of asynchronous update indexes may be that it also may help to reduce index contention in data sharing for hot index pages (i.e. keys) are inserted in ascending/descending key sequence).

In one embodiment, the stale index may be maintained in the current status until a predefined criterion is met, which is based on a predefined stale-current-threshold. This means that the stale index may be kept current after the query that caused the index to be updated and changed to the current status. Several criteria may be used for such a determination. E.g., if the workload of the database management system is low, stale indexes may be kept current until the workload does not allow keeping stale indexes current any longer. In another case, many queries may have run against a table with a stale index within a short timeframe. In this case, the database management system, or a related maintaining unit may determine that the probability for another query against such a table with a stale index might be relatively high. In particular, if there may be active queries executed using that index, this index may be kept in the current status. Thus, the status of the index may be altered dynamically—in this case from a stale status to a current status.

Also, the other direction of a dynamic altering may be possible. If the database management system may determine that no active queries run against that index any longer, the status of the index may dynamically be altered from the status current to the status stale again.

In one embodiment described above, the method includes monitoring for at least a part of the stale indexes the log information since a last refresh of the stale index, and if a predefined threshold relating to index changes in the log information relating to the stale index, exceeds a predefined value, triggering a refreshing of the stale index. In such a case, there may be no actual queries to a table with a stale index in the database management system, but also the stale index has not been updated for a longer time. Then, it may be determined to update the stale index. Such a process may be run periodically or continuously, but it may not permanently guarantee that a stale index is current.

In particular, the threshold may be defined as a maximum time delay between the actual time and a last complete refresh time. E.g., in one embodiment it may be useful to let a stale index become older than one hour. In another embodiment, it might be sufficient to refresh a stale index just once a day, or once a week or once a month.

In one embodiment, the predefined threshold may be related to the number of new index entries in the log information since the last refresh of a stale index. E.g., a system administrator may define that after 1000 entries—or any other number of entries—in the log information then stale index has to be updated. In case the number may be set to just one, then the asynchronous refresh of the stale index would happen as fast as possible on a continuous basis.

In one embodiment, the set of stale indexes is maintained by refreshing the stale index in response to a first query to a table relating to the stale index based on the log information accumulated since a previous refreshing of the stale index, thereby bringing the stale index in accordance with the current status for the time of the first query to the table relating to the stale index. This will ensure that even in the case an index is in a stale status, a query will return correct and complete results, because the index is at the time of the query in a current status.

In one embodiment a second query is performed against a table relating to the stale index having a non-updated stale index. Such a query would read a status of the database management system at an instance in the past. However, if the database has time-stamped entries and a query would be specified defining a point in time before the last refresh, then a stale index may not need to be refreshed. Such a query may be defined as an "as of" query, or "point in time" query, or temporal query. This may make a query much faster compared to a situation in which a stale index may be brought to current status first.

In one embodiment, a deferred index may be maintained in the stale status until a predefined criterion is met depending on a predetermined deferred-stale-threshold. This is similar to the case in which a stale index may be kept in the current status.

In one embodiment, the method includes delaying, in response to a query to a table relating to a stale index, an access to the table relating to the stale index until the table relating to the stale index has been brought to the current status. In particular, such a delay may be caused by a query optimizer that optimizes the overall performance of the database management system. This may make it possible to access a table with the most current index although the access is performed via a stale index.

In on embodiment, the method includes partitioning the table relating to the stale index and the stale index, and wherein the stale index partitions are in different statuses. In particular, one of the stale index partitions may be in the stale status while the other stale index partition may be in the current status. This may enhance the overall performance of the database management system even further because only the part of table associated with the related index partition, may be brought to a current status. However, it is not necessarily required to also partition an index relating to a partitioned table. However, in this case the stale index process runs as described before, for a complete table.

In one embodiment, the stale index partitions are refreshed independently from each other. This means that the different index statuses for a partitioned table with a partitioned index may be maintained for a longer period of time independently from each other. As a consequence, one part may be kept or maintained in a stale status while the other part or partition of a stale index, and also the corresponding table may be maintained current because a lot of queries run again this particular partition.

Furthermore, in one embodiment, the independent refreshing of partitioned indexes may be performed temporarily in parallel, temporarily overlapping, or sequentially.

It should be noted that embodiments may take the form of an entirely hardware implementation, an entirely software embodiment or an embodiment containing both, hardware and software elements. In a preferred embodiment, the invention is implemented in software which includes, but is not limited to, firmware, resident software and microcode.

In one embodiment, a data processing program for execution in a data processing system is provided comprising software code portions for performing the method, as described above when the program is run on data processing system, such as a computer.

Furthermore, embodiments may take the form of a computer program product, accessible from a computer-usable or computer-readable medium providing program code for use by or in connection with a computer or any instruction execution system. For this purpose of this description, a computer-usable or computer-readable medium can be any apparatus that may contain, store, communicate, propagate, or transport the program for use by or in a connection with the instruction execution system, apparatus, or device.

The medium may be an electronic, magnetic, optical, electromagnetic, infrared or a semi-conductor system for a propagation medium. Examples of a computer-readable medium include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blue-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular between features of the method type claims, and features of the apparatus type claims, is considered as to be disclosed within this document.

While the invention has been described with respect to a limited number of embodiments, those skilled in the art, having benefit of this disclosure, will appreciate that other embodiments can be devised, which do not depart from the scope of the invention as disclosed herein. Accordingly, the scope of the invention should be limited only by the attached claims.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method for maintaining a set of indexes in a database management system having at least one table, the method comprising:

defining, for at least a part of said indexes, a status from a group of statuses, the group of statuses comprising: a current status, a stale status, and a deferred status, the defining resulting in: a set of current indexes, a set of stale indexes, and a set of deferred indexes in the database management system;

maintaining the set of current indexes by refreshing a current index synchronously together with a table change relating to the current index;

maintaining the set of stale indexes by refreshing a stale index continuously and asynchronously to table modifications relating to a table relating to the stale index based on one or more of:
  a maximum time delay between the actual time and a last complete refresh time, and
  a number of new entries in a log reflecting the table modifications since a last refresh of the stale index,
wherein the refreshing is performed by a daemon or process that has a given system priority with respect to table modifications and is run continuously and independently of the table modifications;

maintaining the set of deferred indexes by building a deferred index from existing metadata in response to a query to a table relating to the deferred index, thereby bringing the deferred index in accordance with the current status for a time of the query to the table relating to the deferred index; and partitioning the table relating to the stale index, and the stale index, wherein the stale index partitions are in different statuses.

2. The method according to claim 1, further comprising:
maintaining the set of stale indexes by refreshing the stale index in response to a first query to a table relating to the stale index based on the log information accumulated since a previous refreshing of the stale index, thereby bringing the stale index in accordance with the current status for the time of the first query to the table relating to the stale index.

3. The method according to claim 1, wherein a second query is performed against a table relating to the stale index having a non-updated stale index.

4. The method according to claim 1, wherein the deferred index is maintained in the stale status until a predefined criterion is met depending on a predetermined deferred-stale-threshold.

5. The method according to claim 1, further comprising:
delaying, in response to a query to the table relating to the stale index, an access to the table relating to the stale index until the table relating to the stale index has been brought to the current status.

6. The method according to claim 1, wherein partitioned stale index partitions are refreshed independently from each other.

7. The method according to claim 1, wherein the independent refreshing is performed temporarily in parallel, temporarily overlapping, or sequentially.

8. A database management system having at least one table, the database management system being configured to maintain a set of indexes and comprising:
  a defining unit configured to define, for at least a part of said indexes, a status from a group of statuses, the group of statuses comprising: a current status, a stale status, and a deferred status, the defining resulting in: a set of current indexes, a set of stale indexes, and a set of deferred indexes in the database management system;
  a first maintaining unit configured to maintain the set of current indexes by refreshing a current index synchronously together with a table change relating to the current index; and
  a second maintaining unit configured to maintain the set of stale indexes by refreshing a stale index continuously and asynchronously to table modifications relating to a table relating to the stale index based on one or more of:
    a maximum time delay between the actual time and a last complete refresh time, and
    a number of new entries in a log reflecting the table modifications since a last refresh of the stale index,
  wherein the refreshing is performed by a daemon or process that has a given system priority with respect to table modifications and is run continuously and independently of the table modifications;
  wherein the first maintaining unit is further configured to maintain the set of deferred indexes by building a deferred index from existing metadata in response to a query to a table relating to the deferred index, thereby bringing the deferred index in accordance with the current status for a time of the query to the table relating to the deferred index;
  a processing unit configured to process data to operate the database management system, wherein the processing unit is further configured to partition the table relating to the stale index and the stale index, wherein the stale index partitions are in different statuses; and
  a storage storing the at least one table and the partitioned table and being accessible by the processing unit.

9. A computer system comprising:
  a database management system having at least one table, the database management system being configured to maintain a set of indexes and comprising:
    a defining unit configured to define, for at least a part of said indexes, a status from a group of statuses, the group of statuses comprising: a current status, a stale status, and a deferred status, the defining resulting in: a set of current indexes, a set of stale indexes, and a set of deferred indexes in the database management system;
    a first maintaining unit configured to maintain the set of current indexes by refreshing a current index synchronously together with a table change relating to the current index; and
    a second maintaining unit configured to maintain the set of stale indexes by refreshing a stale index continuously and asynchronously to table modifications relating to a table relating to the stale index based on one or more of:
      a maximum time delay between the actual time and a last complete refresh time, and
      a number of new entries in a log reflecting the table modifications since a last refresh of the stale index,
    wherein the refreshing is performed by a daemon or process that has a given system priority with respect to table modifications and is run continuously and independently of the table modifications;
    wherein the first maintaining unit is further configured to maintain the set of deferred indexes by building a deferred index from existing metadata in response to a query to a table relating to the deferred index, thereby bringing the deferred index in accordance with the current status for a time of the query to the table relating to the deferred index;
  a processor configured to process data to operate the database management system, wherein the processing unit is further configured to partition the table relating to the stale index and the stale index, wherein the stale index partitions are in different statuses; and
  a memory storing the at least one table and the partitioned table and being accessible by the processing unit.

10. A computer program product for maintaining a set of indexes in a database management system having at least one table, the computer program product comprising:

a non-transitory computer readable storage medium having computer readable program code embodied therewith, the computer readable program code comprising:

computer readable program code configured to define, for at least a part of said indexes, a status from a group of statuses, the group of statuses comprising: a current status, a stale status, and a deferred status, the defining resulting in: a set of current indexes, a set of stale indexes, and a set of deferred indexes in the database management system;

computer readable program code configured to maintain the set of current indexes by refreshing a current index synchronously together with a table change relating to the current index;

computer readable program code configured to maintain the set of stale indexes by refreshing a stale index continuously and asynchronously to table modifications relating to a table relating to the stale index based on one or more of:

a maximum time delay between the actual time and a last complete refresh time, and a number of new entries in a log reflecting the table modifications since a last refresh of the stale index, wherein the refreshing is performed by a daemon or process that has a given system priority with respect to table modifications and is run continuously and independently of the table modifications;

computer readable program code configured to maintain the set of deferred indexes by building a deferred index from existing metadata in response to a query to a table relating to the deferred index, thereby bringing the deferred index in accordance with the current status for a time of the query to the table relating to the deferred index; and computer readable program code configured to partition the table relating to the stale index and the stale index, wherein the stale index partitions are in different statuses.

11. The computer program product according to claim 10, further comprising:

computer readable program code configured to maintain the set of stale indexes by refreshing the stale index in response to a first query to a table relating to the stale index based on the log information accumulated since a previous refreshing of the stale index, thereby bringing the stale index in accordance with the current status for the time of the first query to the table relating to the stale index.

12. The computer program product according to claim 10, wherein a second query is performed against a table relating to the stale index having a non-updated stale index.

13. The computer program product according to claim 10, wherein the deferred index is maintained in the stale status until a predefined criterion is met depending on a predetermined deferred-stale-threshold.

14. The computer program product according to claim 10, further comprising:

computer readable program code configured to delay, in response to a query to the table relating to the stale index, an access to the table relating to the stale index until the table relating to the stale index has been brought to the current status.

15. The computer program product according to claim 10, wherein partitioned stale index partitions are refreshed independently from each other.

16. The computer program product according to claim 10, wherein the independent refreshing is performed temporarily in parallel, temporarily overlapping, or sequentially.

* * * * *